Dec. 11, 1934.  L. B. GREEN  1,984,129
ELECTRIC BEVERAGE WATER HEATER
Filed March 22, 1934
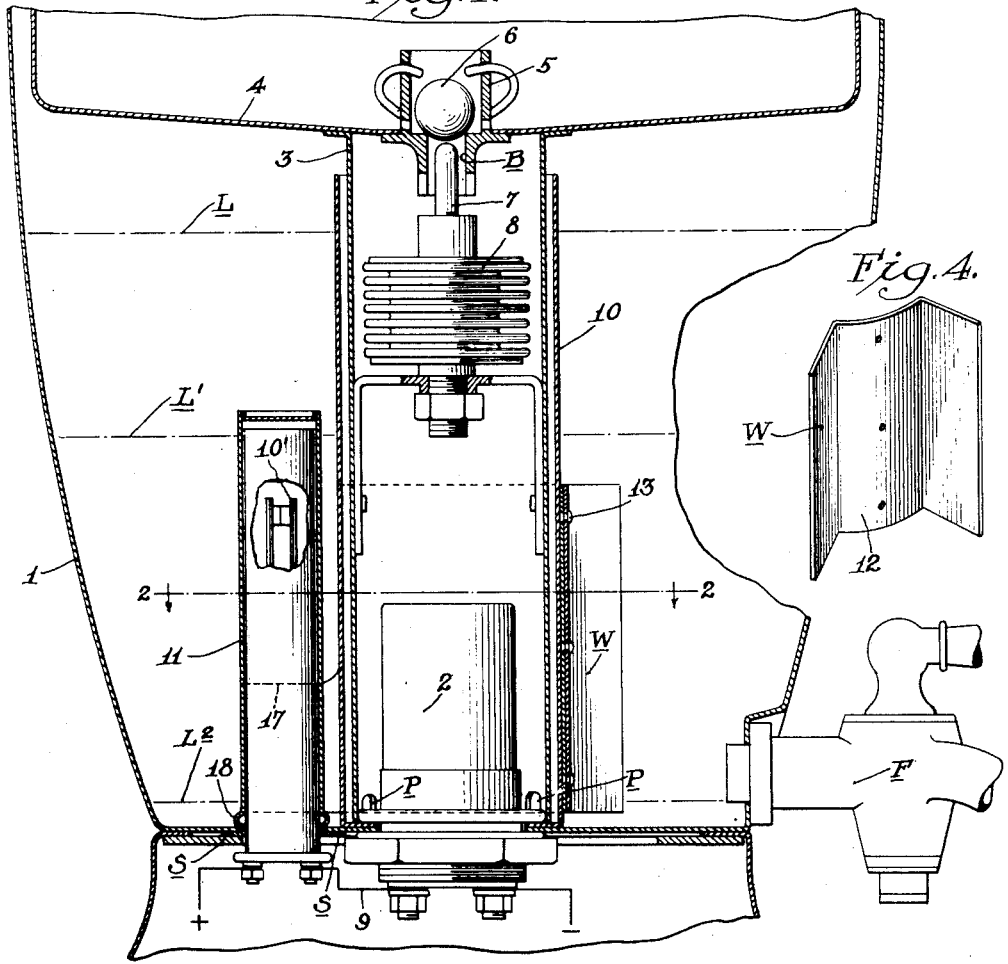
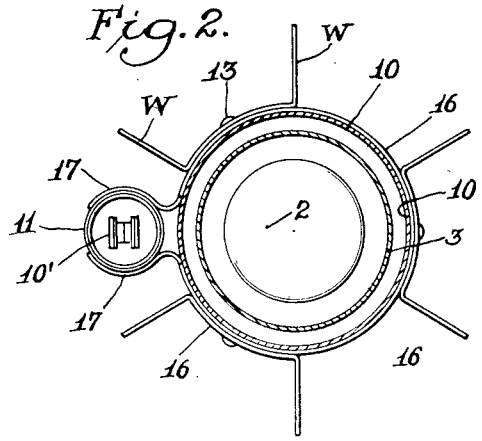
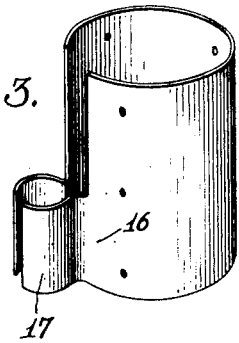
Inventor:
Lee B. Green
by Albert Scheible
Attorney Patented Dec. 11, 1934

1,984,129

UNITED STATES PATENT OFFICE 1,984,129

ELECTRIC BEVERAGE WATER HEATER

Lee B. Green, Lakewood, Ohio, assignor to The Globe Machine & Stamping Company, Cleveland, Ohio, a corporation of Ohio Application March 22, 1934, Serial No. 716,849

10 Claims. (Cl. 219—44)

My invention relates to improvements in the beverage water heater of my United States Patent #1,920,013 of July 25, 1933, for overcoming objections which have been observed during the operation of the water heater disclosed in my said patent.

In the heater of that patent, which was designed for household use, a cup (into which cold water can be poured manually) has its bottom sealed to the upper end of a riser tube which seats at its lower end on the bottom of the can-like container or body portion of the heater. The bottom of the cup has a discharge port through which water flows into the riser tube and over an electric heating member in the lower portion of this tube. The heated water then issues through ports in the lower end of the said tube into the bore of a surrounding tubular baffle, which baffle is of less height than the riser tube so that the heated water has to flow over the top of the baffle before it is discharged into the hot-water storing compartment radially outward of the baffle.

The flow of cold water from the cup into the riser tube is controlled by a valve connected to a thermostatic member disposed within the riser tube, so as to adjust this flow to the rate at which the heating member will raise the admitted water to the temperature suitable for beverage purposes, and the operation of the heating member is automatically controlled by a thermostatic switch which has its thermally responsive portion in heat-conducting relation to the hot water stored in the said compartment.

In watching the generally satisfactory operation of beverage water heaters constructed according to the disclosure of my said patent, I have occasionally observed the hereafter recited difficulties or shortcomings, to the overcoming of which difficulties my presented improvements are directed:

(1) Since the thermally responsive member of the control switch must be associated with the lower portion of the hot-water storing compartment, so as to be operative even when relatively little water is in this compartment, the level of the stored hot water is usually considerably above the top of this thermostatic member. When this stored hot water has cooled sufficiently to cause the thermostatic member to restart the operation of the heating member and the flow of cold water past the latter, the freshly heated water is discharged over the tubular baffle upon the top of the already stored water. Since convection currents do not operate downwardly in this water, the lower portion of the stored water remains at a considerably less temperature than the upper (added) hot water, so that the water which is first withdrawn through a faucet connection to the lower part of this compartment will not be up to the desired beverage temperature. My present invention overcomes this temperature difference between long stored hot water and the freshly added hot water by providing metallic means for causing freshly heated water to add heat to the lower portion of the stored water.

(2) When the thermally responsive member of the thermostatic switch is disposed exteriorly of the heater body, as shown in my said patent, this member is unduly affected by the room temperature, so that it does not respond fairly to the temperature of the stored hot water. As one step toward avoiding this shortcoming, I now dispose my thermostatic switch within an upwardly sealed metallic riser tube (or switch casing) fastened at its lower end to the bottom of the can-like heater body.

To prevent leakage, this switch casing needs to be hard-soldered to the bottom of the heater body, and during the normal use of my beverage water heater, the switch casing generally will be surrounded for at least the major portion of its height by water which will distribute heat conveyed to this casing from the heating member through the metal bottom of the heater body. However, if all or nearly all of the stored hot water has been withdrawn quite rapidly, so as to leave little or no heat-absorbing water around the lower portion of the thermostat casing, the heat conducted to the thermostat by the bottom of the heater body may melt the solder before the thermostatic switch will shut off the current.

Theoretically, this difficulty can be avoided by placing a fuse in series with the thermostatic member and disposing this fuse under, and sufficiently close to, the bottom of the heater body so that heat radiation from the said bottom will melt the fuse (if suitably selected) before the solder is affected. However, any commercial fusible link or wire suitable for this purpose will gradually deteriorate when subjected to the intermittent heating and cooling, thereby lowering the temperature of the fuse (often a hundred or even two hundred degrees Fahrenheit), so that dependence cannot be placed on the use of a fuse for the recited purpose. Moreover, a beverage water heater of the here considered type is generally used by women and others who neither keep a supply of fuses nor are skilled in replacing delicate fuses without injuring them.

My present invention solves the solder-protecting problem by providing means for conducting heat to the lower portion of the switch casing auxiliary to the conduction of such heat through the bottom of the heater bottom; and by disposing these auxiliary means so that the conduction of heat through the same, when the water storage chamber is empty or almost so, will insure an opening of the thermostatic switch before the heater bottom becomes sufficiently heated to melt the solder.

Illustrative of my above recited improvements,

Fig. 1 is a fragmentary central and vertical section through a beverage water heater embodying all features of my invention.

Fig. 2 is a fragmentary horizontal section, taken along the line 2—2 of Fig. 1.

Fig. 3 is a reduced perspective view of the heat-conducting member which connects the baffle tube with the housing of the thermostatic switch.

Fig. 4 is a reduced perspective view of one of the auxiliary fin members which conduct heat from the tubular baffle to water in the lower portion of the hot-water storing compartment.

In the portions of a beverage water heater shown in Fig. 1, the generally can-like heater body 1 has an upright electric heating member 2 supported by the bottom 1a of this heater body and freely surrounded by a riser tube 3 which has its lower end seated on the said bottom, and which tube is considerably taller than the heating member. A cold-water receiving cup 4 has its bottom member seated upon and sealed to the upper end of this riser tube and has a port through which water can discharge downwardly into the said tube, this port being here shown as an upright bore B in a valve body 5 housing a valve ball 6 which is adapted to be raised off its seat by a valve stem 7 on a thermostatic bellows 8, after the manner more fully disclosed in my copending application #716,850, filed March 22, 1934 on a thermostatically controlled valve.

The heating member 2 is in a circuit 9 in series with a thermostatic switch 10 supported within an upwardly closed upright metal tube 11 (or switch casing) which has its lower end clinched to the bottom 1a of the heater body and also sealed to this bottom by hard solder S. When the heater is cold and is first to be used after cold water has been poured into cup 4, the thermostatic bellows are contracted (as in Fig. 1), leaving the valve ball 6 in its closure position, and the thermostatic switch is closed.

When current is then supplied to this circuit, the heating member 2 quickly heats the interior of the riser tube 3 and the expansion of the thermostatic bellows then raises the valve ball off its seat so as to allow cold water to flow down over the said bellows and over the heating member. The heated water then accumulates both within the said riser tube and in the annular space between that tube and a tubular baffle 10 which surrounds this tube but is of less height than the latter, admission of the water to this space being through ports P at the lower edge of the riser tube 3, until the hot water flows over the upper end of the said baffle.

Since additional cold water may be poured into the cup 4 at any time, the level of the hot water in the annular hot-water storing space between the tubular baffle 10 and the riser wall of container may vary considerably, particularly when no hot water has been withdrawn (through the faucet F) from the lower portion of this storage space, and this level may be at such an elevation as L in Fig. 1. However, as soon as the temperature of the switch casing 11 reaches the maximum for which the switch 10 was adjusted, this switch opens so as to halt the operation of the heating member.

This stored hot water is cooled gradually by radiation through the walls of the heater body until the temperature of the thermostatic switch falls sufficiently to cause the switch to close again. If the water level has fallen, say to the level L¹, through withdrawals of hot water, by the time the switch restarts the heating action, the freshly heated water then discharged over the top of the tubular baffle 10 will mainly remain at the top. Consequently, the lower portion of the water will be of considerably lower temperature than the freshly heated water and inadequately hot for the desired beverage purposes, since an insufficient amount of heat is conducted through the lower portion of the tubular baffle to the lower portion of the stored hot water from the hot water flowing up the tubular space between this baffle and the riser tube.

To remedy this defect, I increase the heat-conducting action of the lower portion of the tubular baffle by providing a plurality of ribs or webs W of considerable area, and I preferably distribute these fins equally circumferentially of the said baffle; and to simplify the assembly I preferably provide each two such webs W with a supporting portion 12 formed for receiving heat from a considerable circumferential portion of the tubular baffle. Thus, the drawing shows the use of three such twin-fin members, each shaped as shown on a reduced scale in Fig. 4, the medial portion 12 of each such member being fastened to the said baffle (conjointly with the hereafter described heat-conducting member) b, a row of rivets 13, and these members being arranged so that the heat-radiating webs extending radially of the baffle and are equally spaced circumferentially of the baffle.

In addition to these heat-conducting webs I also provide means for conducting heat from the said baffle to the lower portion of the metal casing 11 of the thermostatic switch. For this purpose I desirably employ a resilient sheet metal member, formed as in Fig. 3, consisting of a longitudinally slitted upright tube 16 of such diameter as to grip the exterior of the tubular baffle 10 tightly, and two clip fingers 17 extending outwardly respectively from the free upright edges of the said tube, these fingers being concaved toward each other and formed for tightly gripping the thermostatic casing 11.

During the assembling, the just described two-fingered heat-conducting member is first slid over the tubular baffle, and desirably only to such an extent as to leave a small clearance between its lower end and the top of the heater bottom 1a, so as to permit any sediment under this member to be flushed out readily; and also to clear the bead 18 on the switch casing, which bead is clinched against the heater bottom. Then each of the twin-webbed heat radiating members has its medial portion 12 fastened to the tubular baffle by the rivets 13 which extend through perforations in both the said medial portion 12 and the slitted tube 16 of the two-fingered member. Thus arranged, the just described heat-conducting provisions, together with the altered position of my thermostatic switch have these effects:

(1) Whenever the operation of the electric heating member is resumed, so that freshly heated water flows upward through the annular space between the riser tube 3 and the tubular baffle 10 (both of which are of metal), the webs W conduct some of the heat of this hot water to the water already stored in the lower part of the storage compartment of my heater, thereby bringing the lower portion of the stored water substantially up to the temperature of the upper part of the stored hot water.

(2) By supporting the thermostatic switch in a metal casing immersed in the stored water and spaced considerably from the riser wall of the heater body, I avoid a direct cooling effect of the outer air on this switch and make it more highly responsive to temperature changes in the stored hot water.

(3) By interposing the heat-conducting clip fingers 17 between the tubular baffle and the lower portion of the switch casing, I speed the heating of the switch when the hot-water storing compartment is empty or nearly empty, so that this switch will open before the heater bottom 1a has become sufficiently hot to melt the hard-solder S.

Illustrative of this protective action, it will be obvious that as long as water is standing to any considerable depth in the hot-water storing compartment, neither the metal heater bottom 1a nor the switch casing 11 can be raised above the boiling point of water. However, when the level of this water falls greatly (as for example to the level $L^2$) so that this casing has the major part of its casing exposed only to air, the air will not conduct heat rapidly from that casing. Consequently, without the clips 17, the conduction of heat from the still operating heating member 2 through the metal heater bottom would heat the switch casing unduly and the increasing temperature of the heater bottom may melt the solder S (which seals the switch casing to the heater bottom) before the switch will open.

With the auxiliary heat-conducting clip fingers disposed as shown, these metal fingers will be above the water level before the hot water is all drawn off, so that at the illustrated water level $L^2$ the major portion of each such finger will be dry and will augment the conduction of heat from the heating member through the heater bottom to the switch casing, thereby speeding the circuit-opening action of the switch to such an extent as to eliminate the danger of having the solder S melt even when the heater is entirely drained. Consequently, I no longer require any fuse in series with such a switch.

By thus protecting the thermostatic switch without the use of a fuse which will vary so much in its protecting action, according to the extent of deterioration of the switch, I am also able to employ a much more sensitive thermostatic switch than would be permissible with the usual fuse protection—as for example one of the now commercial type in which the switch is in an inner housing 17 from which the air has been exhausted.

In addition to affording the already recited advantages, the speeding up of the opening of the thermostatic switch also avoids the annoyance which has been found to occur when the user forgets to replenish the cold water so that the cup is empty. In such a case, some water usually is still within the lower part of the tubular baffle and in contact with the heating member. Consequently, when the switch again actuates the heating action after the stored water has cooled sufficiently to operate the switch, this residual water is speedily converted into steam, and the heating of the bellows 8 by this steam opens the discharge port of the cup so that this steam will issue into the room through the usual cover vent of the appliance. However, when the switch casing has my here disclosed auxiliary heat-conduction from the baffle, the heat of the steam will cause the switch to open before an annoying quantity of steam has thus been emitted.

Moreover, I have found that the above described features cooperate admirably with each other in my thus equipped water heater, as they enable the user to draw off the water at a much more uniform temperature, regardless of both the water level in the heater and the time which hot water has been stored in the heater, than was possible with the original arrangement disclosed in my said Patent #1,920,013.

In practice, I have found it preferable to have the clip fingers 17 extend upwardly for only a minor fraction of the height of the heat-conducting webs W. I also have found these webs to serve their purpose adequately when the sum of their widths is approximately equal to the circumference of the baffle tube 10, and when the height of these webs is somewhat less than half the height of the riser tube 3.

However, I do not wish to be limited to the just mentioned proportions, or to other details of the construction and arrangement here disclosed, since many changes could obviously be made without departing either from the spirit of my invention or from the appended claims. So also, it is to be understood that the use of my here disclosed heater is not to be limited to the heating of water to a beverage temperature, since it obviously would function in the described manner with other liquids and other temperature adjustments.

I claim as my invention:

1. A liquid heater comprising an upright can-like heater body having its discharge outlet near its bottom; an upright metallic tubular baffle sealed at its lower end to the bottom of the heater body and spaced from the riser wall of the heater; a cold-liquid receiving cup supported within the heater body with its bottom spaced upwardly from the upper end of the said baffle, the said cup having discharge outlet overlying the upper end of the baffle; means disposed between the bottom of the heater body and the bottom of the cup whereby liquid discharged from the cup is heated and is thereafter caused to flow upwardly within the baffle and the top of the baffle into the annular space between the baffle and the riser wall of the heater body; and a plurality of upright metallic heat-conducting webs fastened to and extending radially outward from the lower half only of the said baffle for increasing the conduction of heat from the baffle to liquid in the lower portion only of the said space.

2. A liquid heater as per claim 1, in which the said heat-conducting means comprises upright webs extending radially of the baffle and presenting their upper ends at an elevation not higher than the mid-height of the baffle, the said webs having their lower ends spaced upwardly from the bottom of the heater body by a distance which is a minor fraction of the height of the said webs.

3. A liquid heater as per claim 1, in which the said heat-conducting webs are metallic members spaced from each other circumferentially of the baffle; each of the said members comprising two upright webs extending radially of the baffle, and a web-connecting element interposed between the inner ends of the said two webs and having its inner face in heat-conducting relation to the baffle.

4. A liquid heater comprising a heater body having a metallic bottom, an electric heating member supported within the lower portion of the heater body and spaced from the riser wall of the heater body; an upright and metallic tubular baffle housing the heating member; means for causing cold liquid to pass the heating member and thereafter upwards within the baffle and over the top of the baffle; a thermostatic switch member controlling the operation of the electric heating member, the switch member including a metallic housing disposed within the heater body and spaced both from the said baffle and the riser wall of the heater body, the said housing having its lower end in heat-conducting relation to the bottom of the heater body; and heat-conducting means auxiliary to the bottom of the heater body and interposed between the said baffle and the lower portion only of the said switch housing.

5. A liquid heater as per claim 4, in which the said heat-conducting means has its lower end spaced upwardly from the bottom of the heater body, by a distance which is a minor fraction of the height of the said heat-conducting means, to permit liquid to flow between the baffle and the switch housing below the said means.

6. A liquid heater comprising a heater body having a metallic bottom and having a discharge outlet in its lower portion; an electric heating member supported within the heater body in heat-conducting relation to the said bottom; a metallic switch housing having its lower end soldered to a part of the said bottom spaced from the heating member; a thermostatic switch disposed within the switch housing and connected in series with the electric heating member; means for causing cold liquid to flow over the heating member and thereafter to be stored with part of the heated liquid disposed between the heating member and the said switch housing; and metallic means auxiliary to the said bottom for conducting heat from the heating member to the switch housing; the said heat-conducting means being in heat-conducting relation only to a part of the switch housing below the midheight of that housing and above the bottom of the heater body, whereby the heat-conducting means serve to expedite the actuation of the said switch when all liquid has been withdrawn from the heater body.

7. A liquid heater as per claim 6, in which the said heat-conducting means is spaced upwardly from the bottom of the heater body by a distance which is a minor fraction of the height of the part of the switch housing which is in heat-conducting relation to the last named means.

8. An assemblage as per claim 6, in which the liquid heater includes a tubular metallic baffle surrounding the heating member and extending between the heating member and the switch housing, the said baffle being spaced from both the heating member and the switch housing and having its lower end in heat-conducting relation to the bottom of the heater body; and in which the heat-conducting member comprises a longitudinally slitted tube clamped to the exterior of the said baffle and at least one finger projecting from the said tube and engaging the switch casing.

9. An assemblage as per claim 6, in which the liquid heater includes a tubular metallic baffle surrounding the heating member and extending between the heating member and the switch housing, the said baffle being spaced from both the heating member and the switch housing and having its lower end in heat-conducting relation to the bottom of the heater body; and in which the heat-conducting member comprises a longitudinally slitted tube clamped to the exterior of the said baffle and two clip fingers concaved toward each other and projecting respectively from the two edges of the slit in the said tube, the said fingers conjointly gripping the switch housing.

10. A liquid heater comprising an upright heater body having a flat metallic bottom provided with two spaced perforations; an electric heating member extending upwardly through one of the said perforations and in heat-conducting relation to the said bottom; a thimble-like upright metallic switch housing overlying the other perforation and sealed at its lower end to the said bottom by solder; a thermostatic switch supported within the switch housing and connected to the electric heating member; and means for causing cold liquid to flow past the heating member and thereafter to be stored with the lower portion of the switch housing surrounded by the hot liquid; and means for preventing the solder from being melted by the action of the heating member when the heater body is empty of liquid, the said solder-preventing means comprising metallic means auxiliary to the metallic bottom of the heater body and normally immersed in liquid for conveying heat from the said heater to a part of the said switch housing spaced upwardly from the said bottom and reaching upwardly in engagement with the said housing to an elevation below the midheight of the switch housing.

LEE B. GREEN.